United States Patent Office 2,701,814
Patented Feb. 8, 1955

2,701,814

FLUOROCARBON COMPOUNDS

George H. Smith, New Canada Township, Ramsey County, Minn., assignor to Minnesota Mining & Manufacturing Company, St. Paul, Minn., a corporation of Delaware No Drawing. Application July 17, 1953, Serial No. 368,820

4 Claims. (Cl. 260—561)

This invention relates to my discovery of a new and useful class of reactive fluorocarbon compounds which are perfluoro secondary amides.

More specifically, the present compounds are aliphatic diperfluoroacylamides represented by the generic formula:

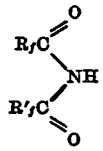

which can be abbreviated as:

$$(R_fCO)(R'_fCO)NH$$

where $R_f$ and $R'_f$ are perfluoroalkyl groups (which may be the same or different), that is, fully fluorinated alkyl groups consisting solely of carbon and fluorine, having the formula $C_nF_{2n+1}$. Of particular interest are the compounds in which the number of carbon atoms in each of the perfluoroalkyl groups (fluorocarbon groups) is in the range of 1 to 11 (i. e., $n$ has an integer value of 1 to 11).

The compounds in which one or both of the fluorocarbon groups contains at least three carbon atoms constitute a sub-class of compounds having value as surface active agents and as starting compounds for making derivative compounds that are valuable surface active agents. In these compounds the presence of a perfluoroalkyl group containing at least three carbon atoms provides the molecule with a terminal fluorocarbon "tail" (or with two such "tails" if both groups contain three or more carbon atoms). The fluorocarbon "tail" is non-polar, highly stable and inert, and is both hydrophobic and oleophobic. Corresponding compounds containing only one or two carbon atoms in each fluorocarbon group do not possess appreciable surface active properties. It is also of critical importance that the fluorocarbon chain or "tail" be free of hydrogen atoms. In particular, the presence of even one hydrogen atom on the last or next to last carbon atom of the "tail" will markedly alter the surface active and solubility properties, render the "tail" polar instead of non-polar, provide a point of attack for chemical reactions, and provide an opportunity for dehydrofluorination.

The compounds which have two identical fluorocarbon acyl groups united to the nitrogen atom can be represented by the equivalent formulas:

$$(R_fCO)_2NH$$
$$(C_nF_{2n+1}CO)_2NH$$

Preferred surface active compounds are those in which $n$ has an integer value of 3 to 11.

I have discovered that these compounds can be made by heating a mixture of a sodium salt of a fluorocarbon monocarboxylic acid, $C_nF_{2n+1}COONa$, and phosphonitrilic chloride (phosphorous dichloronitride), $PNCl_2$, in the presence of butyl benzene solvent or the like, and recovering the product by distillation. Apparently the hydrogen of the product compound is derived from the butyl benzene rather than from the moisture inherently present in the system. (See "Example 1".)

The present compounds can also be made by reacting primary fluorocarbon amides with fluorocarbon acid anhydrides:

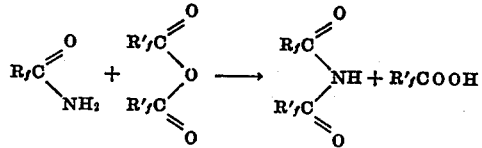

The reaction can be conveniently performed by refluxing the starting compounds and then separating the secondary amide by fractional distillation. It will be noted that the $R_f$ and $R'_f$ groups of the product compound will be different when the starting compounds have correspondingly different fluorocarbon groups.

The present compounds have the peculiarity, as compared with secondary amides of conventional organic chemistry, that they readily react with water and alkalies. They are acidic. When vigorously heated with base, ammonia is liberated.

The present compounds provide useful starting compounds for making the corresponding dihydro secondary amines, the bis(1,1-dihydroperfluoroalkyl) amines:

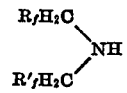

This can be accomplished by reduction of the amide with lithium aluminum hydride. These secondary amines are weak bases which form salts with strong acids (such as hydrochloric salts) in anhydrous solvents (such as ether). The hydrochloride salts are easily split by water at room temperature to regenerate the secondary amine, which is unusual since the regeneration of amines from amine salts usually requires the action of strong alkali. These amines and their salts have marked surface active properties when one or both of the perfluoroalkyl groups ($R_f$ and $R'_f$) is a fluorocarbon "tail" containing three or more carbon atoms.

These secondary amines have utility for making acylamide derivatives, by reaction with carboxylic acid anhydrides and acid chlorides to obtain N,N-bis(1,1-dihydroperfluoroalkyl) acylamides:

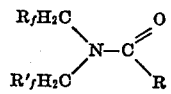

where R is a hydrocarbon or halogenated hydrocarbon group. Examples are N,N-bis(1,1-dihydroperfluorobutyl) acetamide:

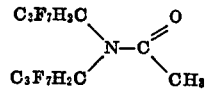

and N,N-bis(1,1-dihydroperfluorobutyl) perfluorobutyramide:

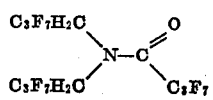

Reaction of a secondary amine with acrylic anhydride or with methacrylic anhydride provides the corresponding N,N-bis(1,1-dihydroperfluoroalkyl) acrylamide or methacrylamide, respectively. An example is N,N-bis(1,1-dihydroperfluorobutyl) acrylamide:

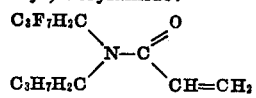

These acrylamides and methacrylamides show great resistance to hydrolysis, and they can be polymerized to form stable and useful high polymers containing a high precentage of combined fluorine.

The foregoing derivatives and polymers are more fully described in the companion application of D. R. Husted and A. H. Ahlbrecht, S. N. 368,825, filed of even date herewith.

The following experimental examples illustrate procedures for making the subject compounds and provide further data on their properties.

*Example 1*

The apparatus was a 100 ml. 3-neck flask provided with a stirrer, thermometer and reflux condenser. A water bubbler was attached to the outlet of the condenser to indicate gas evolution. The flask was charged with 50 ml. of butyl benzene (serving as a solvent reaction medium) and then with 6.8 grams (0.05 mole) of phosphonitrilic chloride ($PNCl_2$) and 23.6 grams (0.1 mole) of the sodium salt of normal heptafluorobutyric acid ($n-C_3F_7COONa$). The mixture was stirred and heated at 135–155° C. for 16 hours. There was some evidence of gassing and the mixture turned a dark brown. The mixture was distilled and a crystalline material sublimed along with some solvent at 124–175° C. The solid was recrystallized from benzene and yielded 7 grams (34% yield) of colorless crystalline solid identified as substantially pure di-n-perfluorobutyramide:

$(n-C_3F_7CO)_2NH$

This compound had a melting point of 82–83° C. Analysis showed 3.2% nitrogen (3.4% calc.) and 62.9% fluorine (65.0% calc.), and no phosphorous or chlorine. The infrared absorption spectrum showed the presence in the molecule of two C=O and one N—H bonds.

*Example 2*

A dry 200 ml. round-bottom flask fitted with a reflux condenser was charged with a mixture of 82 grams (0.2 mole) of n-perfluorobutyric anhydride and 41.6 grams (0.2 mole) of n-perfluorobutyramide. The mixture was refluxed for 16 hours, and was then distilled through a 6–10 plate fractionating column. The fraction having a boiling point range of 155–157° C. (at 742 mm.) was obtained in a yield of 67 grams and was identified as relatively pure di-n-perfluorobutyramide. The material crystallized on standing, and the crystalline product had a melting point of 82–83° C. Analysis showed 62% fluorine (65% calc.) and 3.4% nitrogen (3.4% calc.). The saponification equivalent was 207 (calc. 204.5).

*Example 3*

A dry 250 ml. round-bottom flask fitted with a reflux condenser was charged with a mixture of 63 grams (0.3 mole) of trifluoroacetic anhydride and 34 grams (0.3 mole) of trifluoroacetamide. The mixture was refluxed for 16 hours and was then distilled. The fraction having a boiling point of 135–136° C. (at 744 mm.) was obtained in a yield of 45 grams and was identified as relatively pure diperfluoroacetamide:

$(CF_3CO)_2NH$

This product was a colorless liquid and analysis showed 54% fluorine (calc. 54%) and 6.6% nitrogen (calc. 6.7%). The saponification equivalent was 102 (calc. 104.5).

*Example 4*

A dry 100 ml. round-bottom flask fitted with a reflux condenser was charged with a mixture of 7 grams (0.0136 mole) of perfluorodecanoic amide,

$n-C_9F_{19}CONH_2$ and 15 grams (0.0148 mole) of perfluorodecanoic anhydride $(n-C_9F_{19}CO)_2O$. The mixture was refluxed for two hours and was then distilled under vacuum through a fractionating column. The fraction having a vacuum boiling point range of 176–179° C. (at 7 mm.) was identified as relatively pure diperfluorocapric amide:

$(n-C_9F_{19}CO)_2NH$

Analysis showed 1.3% nitrogen (calc. 1.4%).

I claim:

1. As new and useful reactive fluorocarbon compounds, the aliphatic diperfluoroacylamides having the formula:

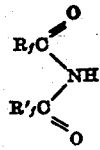

where $R_f$ and $R'_f$ are perfluoroalkyl groups that each contain from one to eleven carbon atoms.

2. As new and useful reactive fluorocarbon compounds, the aliphatic diperfluoroacylamides having the formula:

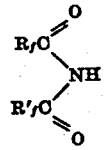

where $R_f$ and $R'_f$ are perfluoroalkyl groups of which one contains from one to eleven carbon atoms and the other of which contains from three to eleven carbon atoms.

3. The aliphatic diperfluoroacylamide compounds having the formula:

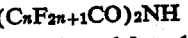
$(C_nF_{2n+1}CO)_2NH$ when $n$ has an integer value of 3 to 11.

4. The di-n-perfluorobutyramide compound having the formula:

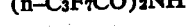
$(n-C_3F_7CO)_2NH$

References Cited in the file of this patent

UNITED STATES PATENTS 2,502,478    Padbury et al. ---------- Apr. 4, 1950

OTHER REFERENCES

Bourne et al., "J. Chem. Soc." (London), Oct. 1952, pp. 4014–19.